United States Patent
Enenkel et al.

(10) Patent No.: US 7,770,719 B2
(45) Date of Patent: Aug. 10, 2010

(54) SELF-CORRECTING CONVEYOR FACILITY

(75) Inventors: Peter Enenkel, Constance (DE);
Thomas Moser, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 58 days.

(21) Appl. No.: 12/324,129

(22) Filed: Nov. 26, 2008

(65) Prior Publication Data

US 2009/0133992 A1 May 28, 2009

(30) Foreign Application Priority Data

Nov. 28, 2007 (DE) .................. 10 2007 057 289
Jul. 4, 2008 (DE) .................. 10 2008 031 642

(51) Int. Cl.
*B65G 39/16* (2006.01)

(52) U.S. Cl. .................. 198/806; 474/123; 226/21

(58) Field of Classification Search .................. 198/806, 198/810.03; 226/19, 21; 474/109, 123
See application file for complete search history.

(56) References Cited

U.S. PATENT DOCUMENTS

| | | | |
|---|---|---|---|
| 2,261,088 A | | 10/1941 | Kendall |
| 4,572,417 A | | 2/1986 | Joseph et al. |
| 5,365,321 A | * | 11/1994 | Koshimizu et al. .......... 198/806 |
| 5,387,962 A | * | 2/1995 | Castelli et al. .............. 198/806 |
| 5,394,222 A | * | 2/1995 | Genovese .................... 198/806 |
| 5,449,166 A | | 9/1995 | Lohmann et al. |
| 5,899,318 A | | 5/1999 | Schwer et al. |
| 5,950,806 A | * | 9/1999 | Warneke ..................... 198/806 |
| 5,979,641 A | | 11/1999 | Graf |
| 6,000,531 A | * | 12/1999 | Martin ........................ 198/806 |
| 6,273,243 B1 | | 8/2001 | Loose et al. |
| 6,619,657 B2 | * | 9/2003 | Horikoshi et al. ........... 271/188 |
| 2005/0225027 A1 | | 10/2005 | Eyraud et al. |

FOREIGN PATENT DOCUMENTS

| | | |
|---|---|---|
| DE | 43 45 160 C2 | 11/1994 |
| DE | 197 04 800 B4 | 8/1998 |
| EP | 0 734 349 B1 | 10/1996 |
| EP | 0 874 960 B1 | 11/1998 |
| FR | 1 435 953 | 6/1966 |
| GB | 608 907 | 9/1948 |

OTHER PUBLICATIONS

"LINEX Förderbandzentrierrollen", pp. 2-6, www.vsr-industrietechnik.de/LINEX_R.31.0.html.

* cited by examiner

*Primary Examiner*—James R Bidwell
(74) *Attorney, Agent, or Firm*—Laurence A. Greenberg; Werner H. Stemer; Ralph E. Locher (57) ABSTRACT

A self-correcting conveyor facility has a conveyor belt for transporting flat objects, in particular mail items. The self-conveying correcting conveyor facility has an elastic conveyor belt for transporting flat objects, in particular mail items. The conveyor belt rests on a correction roller, which is supported in a rotatable manner in a roller support. The roller support is supported in a fixed support in such a manner that it can be rotated about a support rotation axis. The fixed support is arranged in such a manner that an angle results between the support rotation axis and the belt axis of the conveyor belt. Displacement of the conveyor belt causes rotation of the correction roller. This rotation stretches the conveyor belt. The rotation produces a restoring force, which displaces the conveyor belt back.

11 Claims, 5 Drawing Sheets

SELF-CORRECTING CONVEYOR FACILITY

CROSS-REFERENCE TO RELATED APPLICATION

This is a continuing application, under 35 U.S.C. §119, of German patent application Nos. DE 10 2007 057 289.3, filed Nov. 28, 2007, and DE 10 2008 031 642.3, filed Jul. 4, 2008; the prior applications are herewith incorporated by reference in their entireties.

BACKGROUND OF THE INVENTION

Field of the Invention

The invention relates to a self-correcting conveyor facility with a conveyor belt for transporting flat objects, in particular mail items.

The object underlying the invention arises for example in sorting systems for flat mail items. Such a sorting system transports a sequence of mail items in an approximately vertical position. Each mail item is hereby clamped temporarily between two vertical conveyor belts. Each conveyor belt is guided around at least two rollers. The rollers are mounted in a rotatable manner on a base plate. The clamping conveyor belts rotate at identical speed and transport the mail item. Such an arrangement is known for example from European patent EP 734349 B1, corresponding to U.S. Pat. No. 5,899,318, or German patent DE 4345160 C2, corresponding to U.S. Pat. No. 5,449,166.

It is required that each conveyor belt is guided around the guide rollers in a setpoint position, running neither too high nor too low above a guide roller. Deviations from the setpoint position can result in disruption of the transportation of the mail items.

In British patent GB 608907, a conveyor facility transports objects on a vertical conveyor belt (there: reference character 10), resting on an idler roller (there: "idler roller 11"). The idler roller is secured to a shaft ("spindle 12"), which is supported in a rotatable manner in a roller support 15, 16, 17. The roller support is connected in a rotatable manner to a fixed support. The fixed support contains a sleeve ("sleeve 21"), which is mounted obliquely on a fixed bed 23. A spigot ("spindle or axle 20") is inserted into the sleeve 21. To protect against dirt the sleeve 21 is enclosed by a further sleeve ("sleeve 24"), which is connected in a fixed manner to the roller support. Stop elements 25 limit the possible rotation of the roller support about the fixed support.

If the horizontal conveyor belt slips to the side from a central position, the roller support rotates so that the rotation axis of the roller is no longer perpendicular to the longitudinal axis of the conveyor belt but is twisted. The oblique bearing of the roller support means that its lower end—when viewed in the conveyance direction of the conveyor belt—is in front of the upper end. In conjunction with the weight of a transported object, this exerts a restoring force, which moves the conveyor belt back into a central position.

A further conveyor facility with position correction is described in U.S. Pat. No. 4,572,417, in the embodiment in FIG. 3. A conveyor belt (there: reference character 12) is guided around a roller support. The roller support is U-shaped and has two arms 48, in which a shaft 22a is supported in a rotatable manner. A roller 22 is supported on the shaft in a rotatable manner, with the conveyor belt wrapped round it. The roller support is connected in a rotatable manner to a further support 56, 58 by way of a further shaft 54. The further support is connected in a fixed manner to a third shaft 60.

A regulated motor may drive the third shaft 60 and therefore the further support and the roller support about the rotation axis A_c of the third shaft. The conveyor facility is thus able to correct an incorrect position of the conveyor belt.

The apparatus described in U.S. Pat. No. 4,572,417 requires a motor, which changes the position of the further support and therefore the roller support, and a regulator.

European patent EP 0874960 B1, corresponding to U.S. Pat. No. 6,273,243, describes a self-correcting conveyor facility for mail items. The conveyor facility has a spring. When the conveyor belt moves out of the setpoint position, the spring automatically exerts a restoring force, which returns the conveyor belt to the setpoint position.

This embodiment requires the spring to be tailored to each conveyor belt and to the force with which the conveyor belt acts on the roller, as well as to the convexity of the roller. The restoring force is also limited by the spring force and may be too small actually to being about a correction.

In a "Brochure for LINEX conveyor belt centralizing idlers", available at http://www.vsr-industrietechnik.de/LINEX_R.31.0.html, called down on Oct. 26, 2007, a conveyor facility with a conveyor belt is described, which is supported horizontally and rests on rubber ribs. Movement of the conveyor belt out of a setpoint position causes the rubber ribs—in some instances in conjunction with gravity—to move the conveyor belt back into the setpoint position.

Supports for conveyor belts are also described in the following publications: U.S. Pat. No. 5,979,641; FR 1435953 A; DE 19704800 B4; and U.S. Pat. No. 2,261,088.

In these publications damping elements are described, which damp the rotation of a roller support.

U.S. patent publication 2005/0225027 A1 describes a conveyor facility with a roller supported in a rotatable manner. The support for this roller is supported in a sprung manner.

SUMMARY OF THE INVENTION

It is accordingly an object of the invention to provide a self-correcting conveyor facility which overcomes the above-mentioned disadvantages of the prior art devices of this general type, with which a correction roller can also be pushed back, if the weight due to the mass of the conveyor belt and a transported object does not produce an adequate restoring force.

With the foregoing and other objects in view there is provided, in accordance with the invention, a self-correcting conveyor facility. The self-correcting conveyor facility contains a conveyor belt extending along a belt axis and embodied as an elastic conveyor belt, a correction roller having a lateral surface, and a support for the correction roller. The support has a roller support and a fixed support. The correction roller is supported in a rotatable manner in the roller support, and the roller support is connected to the fixed support such that the roller support can be rotated relative to the fixed support about a support rotation axis. The fixed support is disposed such that an angle results between the belt axis and the support rotation axis, which is greater than 0 degrees and smaller than 90 degrees. A displacement of the conveyor belt perpendicular to the belt axis and relative to the correction roller causes the roller support to be rotated about the support rotation axis with the correction roller and the rotation exerting a restoring force on the conveyor belt, which displaces the conveyor belt back. The elastic conveyor belt is guided around the correction roller such that the conveyor belt rests on part of the lateral surface of the correction roller. The rotation of the roller support about the support rotation axis with the correction roller causes stretching of the elastic conveyor belt and the stretching produces the restoring force.

The self-correcting conveyor facility according to the invention has an elastic endless conveyor belt, a correction roller and a support for the correction roller.

The conveyor belt extends along a belt axis. The conveyor belt is guided around the correction roller in such a manner that the conveyor belt rests on part of the lateral surface of the correction roller.

The support contains a roller support and a fixed support. The correction roller is supported in a rotatable manner in the roller support. The roller support is connected to the fixed support in such a manner that the roller support can be rotated relative to the support about a support rotation axis. The fixed support is arranged in such a manner that an angle results between the belt axis of the conveyor belt and the support rotation axis, which is greater than 0 degrees and smaller than 90 degrees.

The conveyor facility according to the invention is embodied in such a manner that the following causal chain results.

If the conveyor belt is displaced perpendicular to the belt axis and relative to the correction roller, the roller support is rotated about the support rotation axis with the correction roller.

This rotation of the roller support with the correction roller causes the elastic conveyor belt to be stretched, in fact asymmetrically relative to the belt axis. The angle at which the fixed support is mounted causes the restoring force acting on the correction roller to be broken down into a first force component, which is absorbed by the fixed support, and a second force component, which is perpendicular to the first force component. The second force component rotates the correction roller in the roller support about the support rotation axis.

This stretching of the elastic conveyor belt produces a restoring force, which acts on the correction roller.

The restoring force displaces the conveyor belt back perpendicular to the belt axis into the original position relative to the correction roller.

This causal chain is brought about primarily in that the correction roller can be rotated not just about its own axis of symmetry but also—together with the roller support—about the support rotation axis and in that the fixed support is arranged together with the correction roller in the roller support at an angle to the belt axis.

The conveyor facility according to the solution does not require sensors to measure the position of the conveyor belt relative to the roller support. Nor are actuators required to change the relative position actively. In particular it does not require a motor or sensor so that the conveyor belt is displaced back into a predetermined setpoint position relative to the correction roller. The apparatus according to the invention instead operates in a self-correcting manner, as it does not require a sensor system or additional actuator system.

The correction roller according to the invention also means that it is not necessary to adjust the conveyor facility manually, for example when the conveyor belt ages, thereby changing its length.

The conveyor facility according to the invention does not exert the restoring force through the weight of the conveyor belt or a transported object but through the elastic conveyor belt, which is stretched and endeavors to contract again. Therefore the self-correcting conveyor facility can also be used in situations, where the weight of a transported object does not produce an adequate restoring force, perhaps because the objects to be transported are too light to exert the restoring force, the conveyor belt has a rough surface, the rough surface rests on a roller and therefore a large restoring force is required, the conveyor facility according to the solution is not used to transport an object but to transmit a rotation from one roller to another roller or a transported object does not rest on the conveyor belt but is clamped temporarily between the vertically arranged conveyor belt and a similarly vertically arranged counter-conveyor belt and transported thus clamped.

The conveyor facility preferably also contains at least one guide roller and a guide support for each guide roller.

Each guide roller is rotationally symmetrical to a guide rotation axis. Each guide roller is supported in a guide support in such a manner that the guide support prevents any change in the position of the guide rotation axis.

The conveyor belt is guided around the guide roller and around the correction roller in such a manner that the conveyor belt rests on part of the lateral surface of the guide roller and part of the lateral surface of the correction roller.

In this preferred embodiment the guide roller guides the conveyor belt in a desired position. The correction roller is used solely to keep the conveyor belt in a predetermined setpoint position relative to the guide roller. The correction roller therefore does not have to be embodied to carry the conveyor belt and an object transported on the conveyor belt or to damp vibrations of the conveyor belt. These tasks are carried out instead by the guide roller, which can only be rotated about one rotation axis and is therefore generally of simpler mechanical structure than the correction roller, which can be rotated about two rotation axes.

In this embodiment the conveyor facility is embodied in such a manner that the following causal chain results.

Positioning of the conveyor belt relative to the guide roller in such a manner that it deviates from a predetermined setpoint position causes the position of the conveyor belt relative to the correction roller to be changed.

This change in the relative position causes the roller support to be rotated about the support rotation axis with the correction roller. This rotation of the roller support with the correction roller causes the elastic conveyor belt to be stretched asymmetrically.

This stretching of the elastic conveyor belt produces the restoring force, which displaces the conveyor belt into the setpoint position relative to the guide roller.

This embodiment means that the conveyor belt is held in or returned to a setpoint position, without the correction roller alone having to ensure compliance with the setpoint position.

In one embodiment the self-correcting effect also operates if the static conveyor belt cannot be displaced relative to the guide roller. For example the friction occurring between the conveyor belt and the guide roller is too great and prevents displacement of the static conveyor belt. According to this advantageous embodiment the restoring force is however adequate to displace the moving conveyor belt. The conveyor facility is embodied in such a manner that the restoring force produced by rotation displaces the conveyor belt, which is moving in the direction of the belt axis, into the setpoint position relative to the guide roller.

The rotations of the roller support with the roller about the support rotation axis are preferably limited and/or damped. The support therefore has a limiting element and/or a damping element. It is possible for the same component to operate both as a limiting element and as a damping element.

The conveyor belt preferably rests on the correction roller with an angle of wrap between 2 degrees and 5 degrees. The conveyor belt also rests on at least one guide roller preferably with such an angle of wrap between 2 degrees and 5 degrees.

The invention can be used for example to transport flat mail items in a sorting system, banknotes in an ATM, paper in a photocopier or fax machine or even drug packages.

Other features which are considered as characteristic for the invention are set forth in the appended claims.

Although the invention is illustrated and described herein as embodied in a self-correcting conveyor facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the exemplary embodiment the inventive conveyor facility is used in a sorting system, which transports flat mail items (standard and large-format letters, postcards, etc.). A sequence of flat mail items is transported through the sorting system in an upright position. Each mail item is hereby clamped between at least two vertical endless conveyor belts. Each endless conveyor belt is guided around at least three guide rollers. The guide rollers are mounted in a rotatable manner on a base plate.

In the exemplary embodiment the mail items are held solely by the conveyor belts during transportation. Their lower edges therefore do not slide over a base plate or another lower support. The conveyor belts therefore absorb the weight of each mail item completely.

Figure 1:
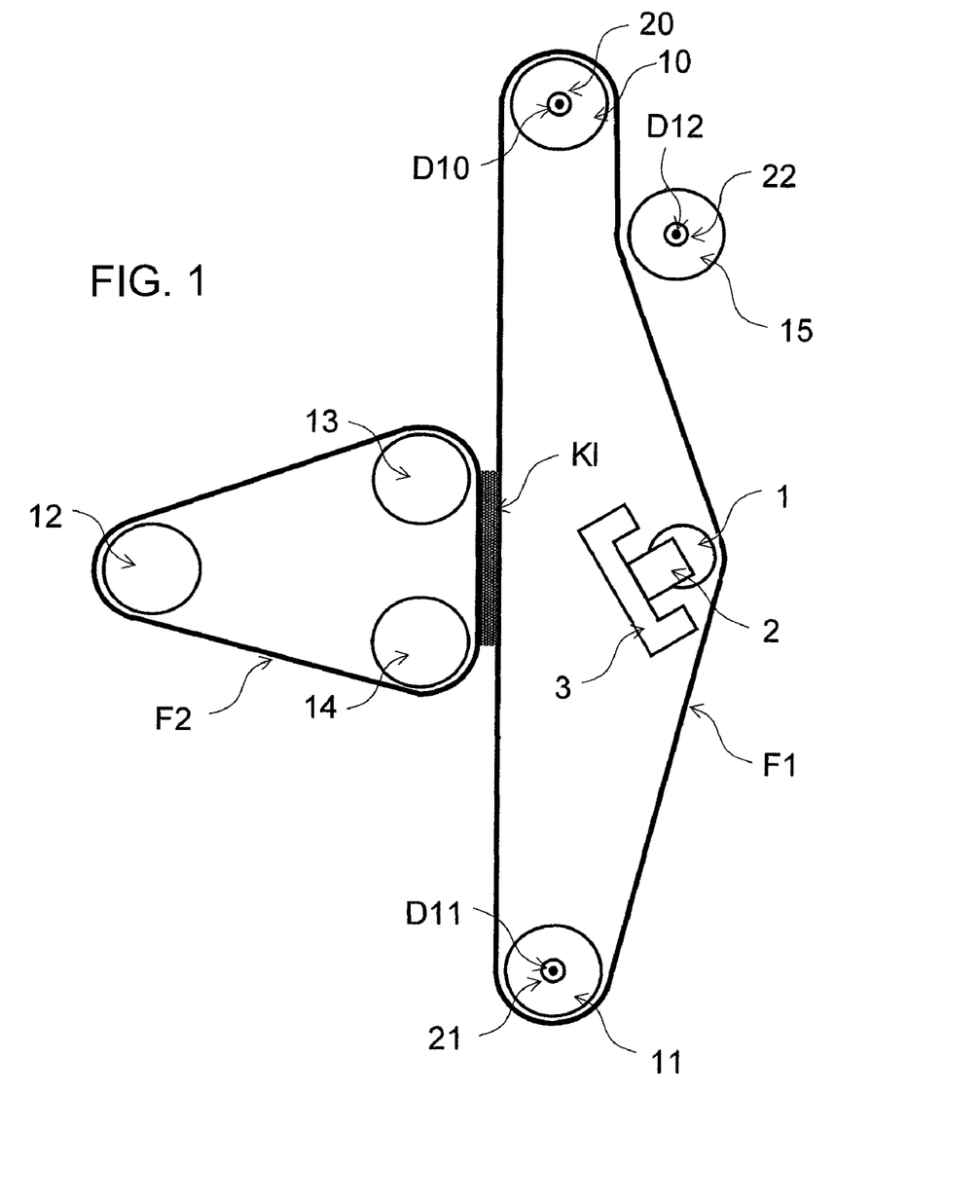
FIG. 1 is a diagrammatic, top plan view of a conveyor facility with two conveyor belts and a correction roller according to the invention.

FIG. 1 shows a top view of an exemplary conveyor facility with two elastic endless conveyor belts F1 and F2. The conveyor belt F1 is guided around the guide rollers 10, 11 and 15 and rests on a correction roller 1. The conveyor belt F2 is guided around the guide rollers 12, 13 and 14. The two conveyor belts F1 and F2 are made from an elastic material, so that they stretch and can be twisted about their respective center axis. It is possible for the conveyor belt F2 to rest on a correction roller as well.

Each conveyor belt is guided around just one driven guide roller. The other guide rollers, on which the conveyor belt rests, are configured as driveless idler rollers. The correction roller 1 also operates as a driveless idler roller. The conveyor belt F1 is moved along a belt axis B by the rotation of the driven roller. The rotating roller preferably carries the conveyor belt F1 with it due to the friction of the surface and the tautness of the conveyor belt F1.

The rollers 10, 11, 12, 13, 14 and 15 operate as guide rollers. They hold the conveyor belts F1, F2 in predetermined setpoint positions. Each guide roller is cylindrical and has rotational symmetry to a guide rotation axis. The respective guide rotation axis, about which a guide roller has rotational symmetry, is perpendicular to the plane of the drawing in FIG. 1.

Each guide roller is supported in one guide support respectively. The guide support prevents any change in the position of the guide rotation axis. The guide rollers 10, 11, 12, 13, 14 and 15 can therefore not be displaced laterally and the respective guide rotation axis can also not be rotated. Therefore each guide roller can therefore be rotated only about its axis of symmetry and not in any other manner.

In one embodiment each guide roller is supported in a rotatable manner in the respective guide support. In another embodiment at least one guide roller embodied as an idler roller has a smooth lateral surface. The conveyor belt slides over the smooth lateral surface of the non-rotating idler roller.

In the exemplary embodiment each guide support is embodied as a shaft, which is supported in a fixed position and about which the guide roller can rotate. FIG. 1 shows the shaft 20, on which the guide roller 10 is positioned, the shaft 21, on which the guide roller 11 is positioned and the shaft 22, on which the guide roller 15 is positioned. FIG. 1 also shows a guide rotation axis D10, about which the guide roller 10 can be rotated, a guide rotation axis D11, about which the guide roller 11 can be rotated, and a guide rotation axis D12, about which the guide roller 15 can be rotated; these are perpendicular to the plane of the drawing in FIG. 1.

Figure 2:
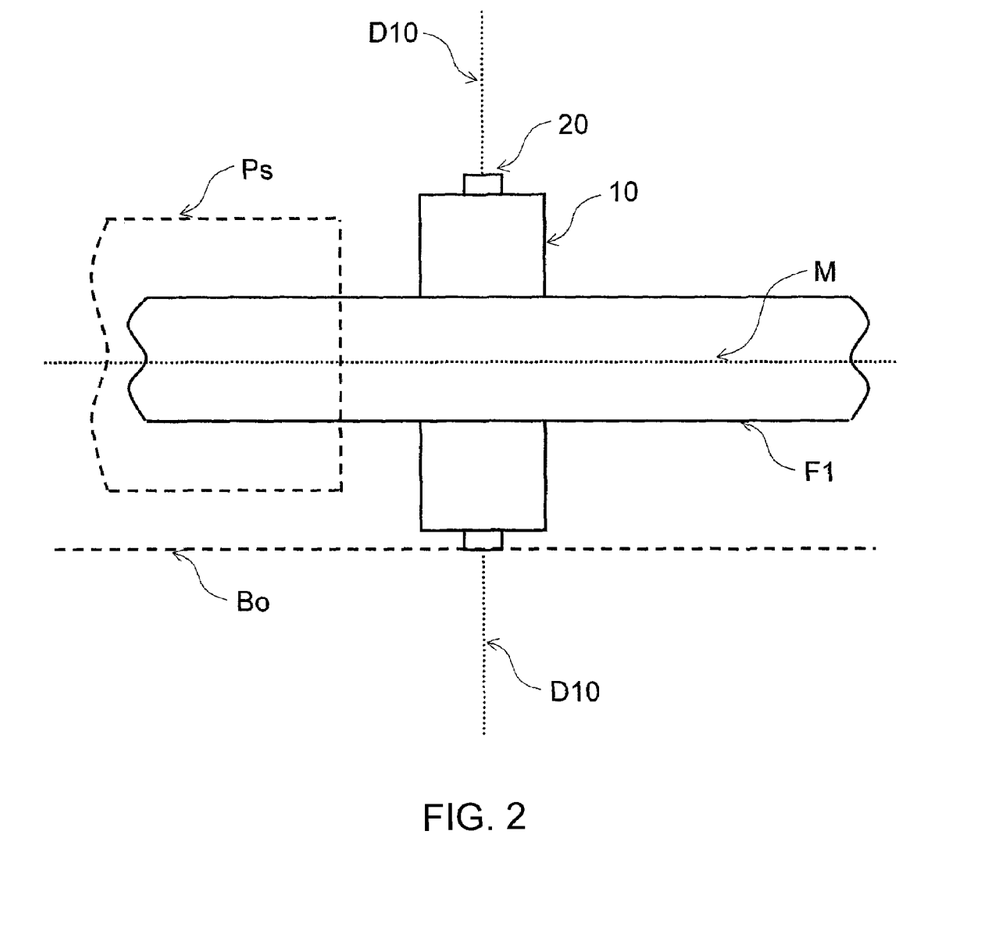
FIG. 2 is a diagrammatic side view of a guide roller shown in FIG. 1.

FIG. 2 shows a side view of the exemplary guide roller 10 from FIG. 1. It shows the guide rotation axis D10, about which the guide roller 10 can be rotated, the shaft 20, on which the guide roller 10 is supported in a rotatable manner and the conveyor belt F1. A setpoint position of the conveyor belt F1 relative to the guide roller 10 is predetermined. A center axis M of the conveyor belt F1 is intended to be an equal distance from the upper and lower ends of the guide roller 10, this being the setpoint position. In this setpoint position a support rotation axis D2 intersects the belt axis B and also the center axis M of the conveyor belt F1 (see FIG. 3). After displacement of the conveyor belt F1 the support rotation axis D2 no longer intersects the belt axis B.

FIG. 2 also shows a mail item Ps and a base surface Bo. It is clear that the lower edge of the mail item Ps does not rest on the base surface Bo but is simply held by the conveyor belt F1 (and the counter conveyor belt F2 (not shown)).

The surfaces of the conveyor belts F1, F2 resting on the rollers are so rough that displacement of a conveyor belt F1, F2 in a direction perpendicular to the plane of the drawing and parallel to the guide rotation axes of the guide rollers requires a minimum force. The weight of a heavy mail item and further external interference variables can nevertheless result in a conveyor belt having an actual position relative to a guide roller, which deviates from the setpoint position.

The conveyor belts are subject to rapid changes in rotational speed during operation. Therefore the surfaces facing the guide rollers and the lateral surfaces are embodied as smooth surfaces. Recesses and projections would quickly wear away and would require frequent manual maintenance work. The conveyor belts F1, F2 therefore have surfaces without recesses and without projections and are guided around the rollers with some elongation so that the conveyor belts F1, F2 want to contract so that a friction force results, which counters displacement of the conveyor belts.

A clamping region K1 results between the two conveyor belts F1 and F2, to clamp and hold mail items temporarily. The surfaces of the conveyor belts facing the mail items are also rough, so the mail items cannot slip downward.

The conveyor belt F1 also rests on the correction roller 1. The correction roller 1 is supported in a rotatable manner in a roller support 2. The roller support 2 is supported in a rotatable manner in a fixed support 3.

The conveyor belt F1 is wrapped around the correction roller 1 at an angle of wrap, which is preferably between 2 degrees and 5 degrees. The conveyor belt F1 rests on the correction roller 1 in one segment of the lateral surface. Viewed from above the lateral surface segment is a segment of a circle corresponding to the angle of wrap. The belt axis B is perpendicular to the line bisecting this segment.

Figure 3:
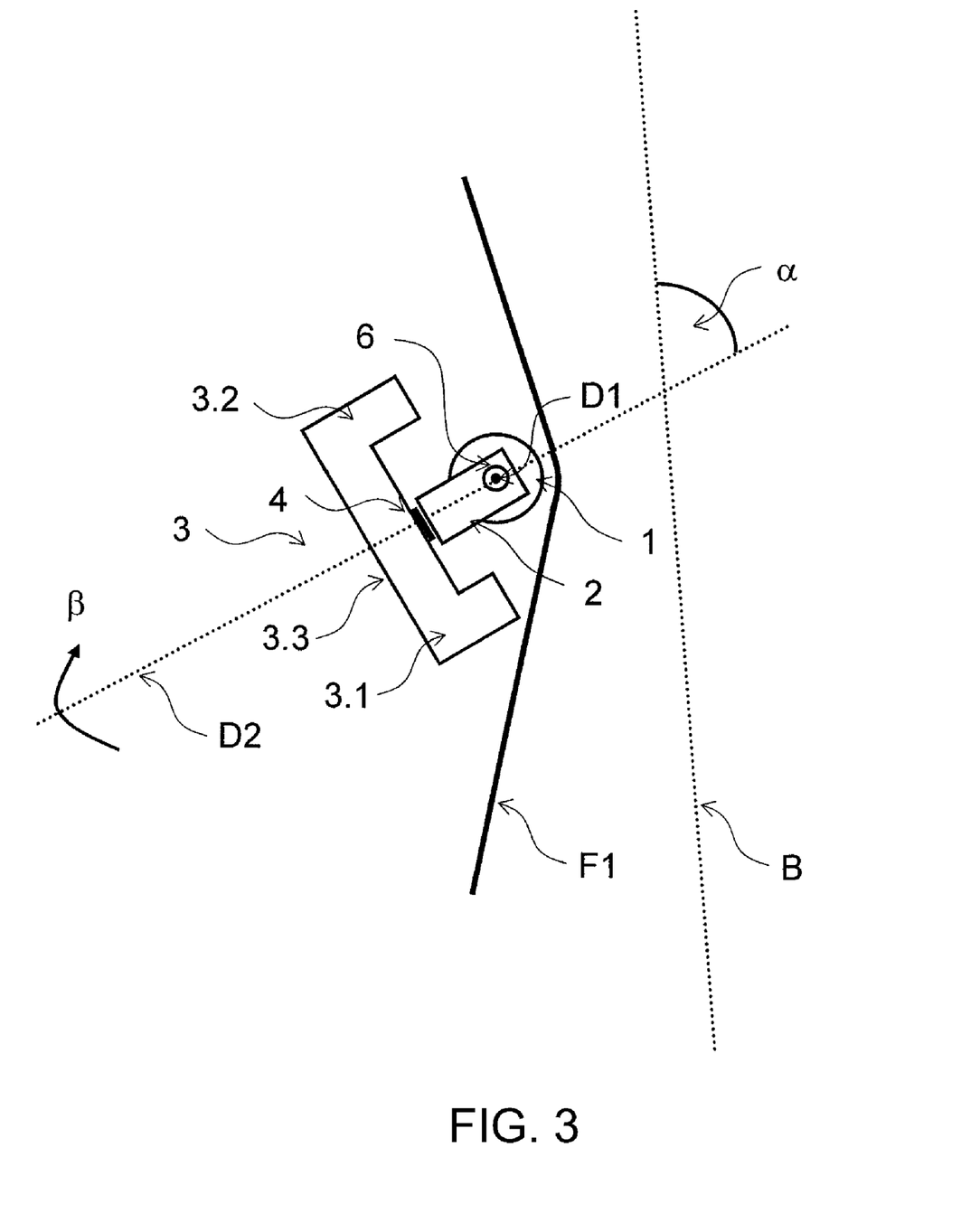
FIG. 3 is a diagrammatic, top view of the correction roller shown in FIG. 1.

FIG. 3 shows the correction roller 1 according to the solution and the conveyor belt of the conveyor facility from FIG. 1 in an enlarged manner. The correction roller 1 is supported in such a manner that it can be rotated about a roller rotation axis D1 in the roller support 2. The rotation axis D1 is perpendicular to the plane of the drawing in FIG. 1 and FIG. 3. The roller support 2 is supported in such a manner that it can be rotated about the support rotation axis D2 in the fixed support 3. The support rotation axis D2 lies in the plane of the drawing in FIG. 3. Viewed from above the fixed support 3 has a U shape with two parallel arms 3.1, 3.2 and a cross support 3.3, which is perpendicular to the support rotation axis D2.

FIG. 1 and FIG. 3 show an exaggerated view of the angle of wrap, with which the conveyor belt F1 is wrapped round the correction roller 1. This angle is preferably between 2 degrees and 5 degrees. FIG. 3 also shows the belt axis B, along which the conveyor belt F1 extends. A putative line perpendicular to the belt axis B bisects the wrap-around region, in which the conveyor belt F1 rests on the correction roller 1. The belt axis B indicates the "average running direction" of the conveyor belt F1.

According to the solution the fixed support 3 and the roller support 2 are affixed so that an angle α is present between the belt axis B of the conveyor belt F1 and the support rotation axis D2. Between the line bisecting the segment, where the conveyor belt F1 rests on the correction roller 1 when viewed from above, and the support rotation axis D2 there is therefore an angle of 90 degrees–α. The angle α is greater than 0 degrees and smaller than 90 degrees. It is preferably between 30 degrees and 80 degrees. By way of example it is 45 degrees.

Figure 4:
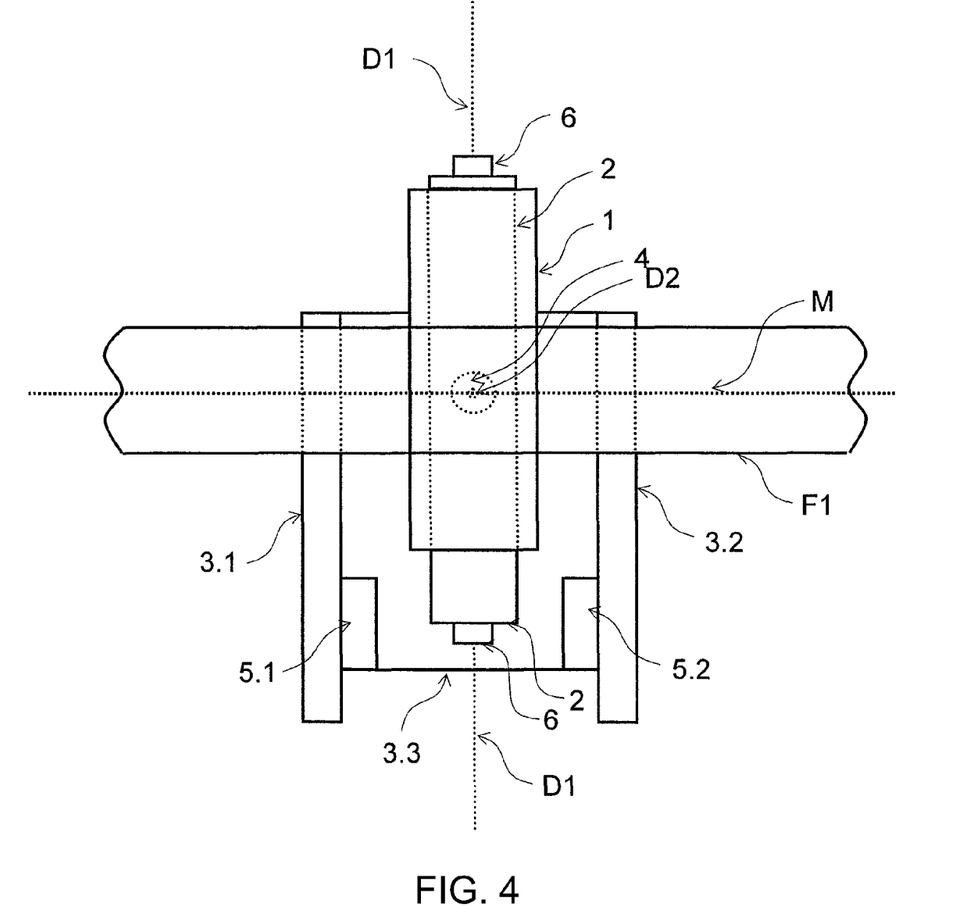
FIG. 4 is a diagrammatic, side view of the correction roller from FIG. 1.

FIG. 4 shows the conveyor facility from FIG. 1 with the correction roller 1 from the front. The cross support 3.3 of the fixed support 3 lies in the plane of the drawing and is mounted on a non-illustrated base plate. The base plate extends in a plane that is perpendicular to the plane of the drawing in FIG. 3. The conveyor belt F1 with its horizontal center axis M is clearly shown.

The conveyor belt F1 is in the setpoint position in front of the correction roller 1 and the fixed support 3. The parts of the fixed support 3 covered by the conveyor belt F1 are shown with a broken line. The roller rotation axis D1, about which the correction roller 1 is supported in a rotatable manner, lies in the plane of the drawing in FIG. 4. The support rotation axis D2, about which the roller support 2 is supported in a rotatable manner, is perpendicular to the plane of the drawing in FIG. 3. In the exemplary embodiment the support rotation axis D2 intersects the center axis M of the conveyor belt F1. The conveyor belt F1 also lies in the setpoint position in the center of the correction roller 1.

The bearing 4 for the shaft, on which the roller support 2 rests, is also perpendicular to the plane of the drawing in FIG. 3. The correction roller 1 rests on a shaft 6, which is let into the roller support 2.

The rotations of the roller support 2 about the support rotation axis D2 are both limited and damped by two damping and limiting elements 5.1, 5.2. These two damping and limiting elements 5.1, 5.2 are secured to the cross support 3.3 in the exemplary embodiment and are made from an elastic material, e.g. rubber.

The stop elements 5.1, 5.2 are arranged in such a manner that they limit the rotation of the correction roller 1 about the support rotation axis D2 to 2 degrees per direction, in other words to 4 degrees in total. Greater rotation of the correction roller 1 could result in excessive stretching of the conveyor belt F1. Because the rotation of the correction roller 1 is limited, the tautness of the conveyor belt F1 at the same time prevents the conveyor belt F1 being displaced too far from the setpoint position. Experiments have shown that in the exemplary embodiment the self-correcting effect of the conveyor facility is optimal with rotations of maximum 2 degrees.

The deflection experienced by a point P on the correction roller 1, which rests on the roller rotation axis D1 of the correction roller 1 is described below. The roller rotation axis D1 is vertical when the correction roller 1 has not been rotated, see FIG. 3. Let $\vec{L}$ be the vector, from the point of intersection of the roller rotation axis D1 and the support rotation axis D2 to point P. The length L of $\vec{L}$ is also the distance between the point P and the support rotation axis D2, which is perpendicular to the plane of the drawing in FIG. 3. Let β be the angle, through which the correction roller 1 is therefore rotated about the support rotation axis D2, because the conveyor belt is not positioned centrally.

Rotation causes the point P to cover a distance $\vec{L2}$. This distance is putatively divided into two distances $\vec{L4}$ and $\vec{L6}$, so that $\vec{L2}=\vec{L4}+\vec{L6}$, $\vec{L4}$ is perpendicular to $\vec{L6}$ and $\vec{4}$ is parallel to the conveyor belt F1 and $\vec{L6}$ is therefore perpendicular to the conveyor belt F1. The rotated roller is projected onto the conveyor belt F1, in a projection direction perpendicular to the conveyor belt F1. The projection of the vector $\vec{L}$ onto the conveyor belt F1 is identified as $\vec{L3}$. L2, L3, L4 and L6 designate the lengths of $\vec{L2}, \vec{L3}, \vec{L4}$ and $\vec{L6}$.

The angle β is likewise divided into an angle δ, which lies on the conveyor belt F1 and therefore in the same plane as $\vec{L4}$, and an angle γ, which is perpendicular to the conveyor belt F1 and therefore lies in the same plane as $\vec{L6}$.

The following relationships then apply:

$$L2 = L/2 * \sin(\beta),$$

$$L3 = L/2 * \cos(\beta),$$

$$L4 = L2 * \cos(90 - \alpha) = L2 * \sin(\alpha)$$

$$\gamma = \arctan(L4/L3) = \arctan\frac{L1 * \sin(\beta)\sin(\alpha)}{L1 * \cos(\beta)}$$

The deflection of the point P about the vector $\vec{L2}$ causes tautening of the conveyor belt F1 and therefore a restoring force. In one embodiment this is proportional to $\vec{L6}$.

The weight exerted by a heavy mail item and the conveyor belt F1 can displace the rotating conveyor belt F1 from its setpoint position along a guide rotation axis, e.g. along the guide rotation axis D10 in FIG. 2 downward. This initiates the following causal chain.

The roller support 2 is twisted about the support rotation axis D2 with the correction roller 1.

Because the fixed support is mounted at an angle α to the belt axis B and because the conveyor belt F1 is wrapped around the correction roller 1 at an angle of wrap, rotation of the correction roller 2 causes the conveyor belt F1 to be stretched.

If the conveyor belt F1 is displaced from the setpoint position downward, the correction roller 1 is twisted counterclockwise, see FIG. 4. This causes the tautened conveyor belt F1, the entire width of which rests on the correction roller 1, to be twisted about the belt axis B and therefore to be stretched.

This rotation is asymmetrical to the belt axis B, because the correction roller 1 has rotated. Rotation results in an oblique buckling edge in the conveyor belt F1.

The stretching of the elastic conveyor belt F1 brings about a restoring force.

This restoring force rotates the correction roller 1 back into the position shown in FIG. 3. At the same time this restoring force displaces the rotating conveyor belt F1 back along the guide rotation axis D10 into the setpoint position.

In the exemplary embodiment the friction resulting between the conveyor belt F1 and the guide rollers is too great to displace the static conveyor belt F1. The rotating conveyor belt F1 is however displaced, because this is the only way a force equilibrium can be established.

Figure 5:
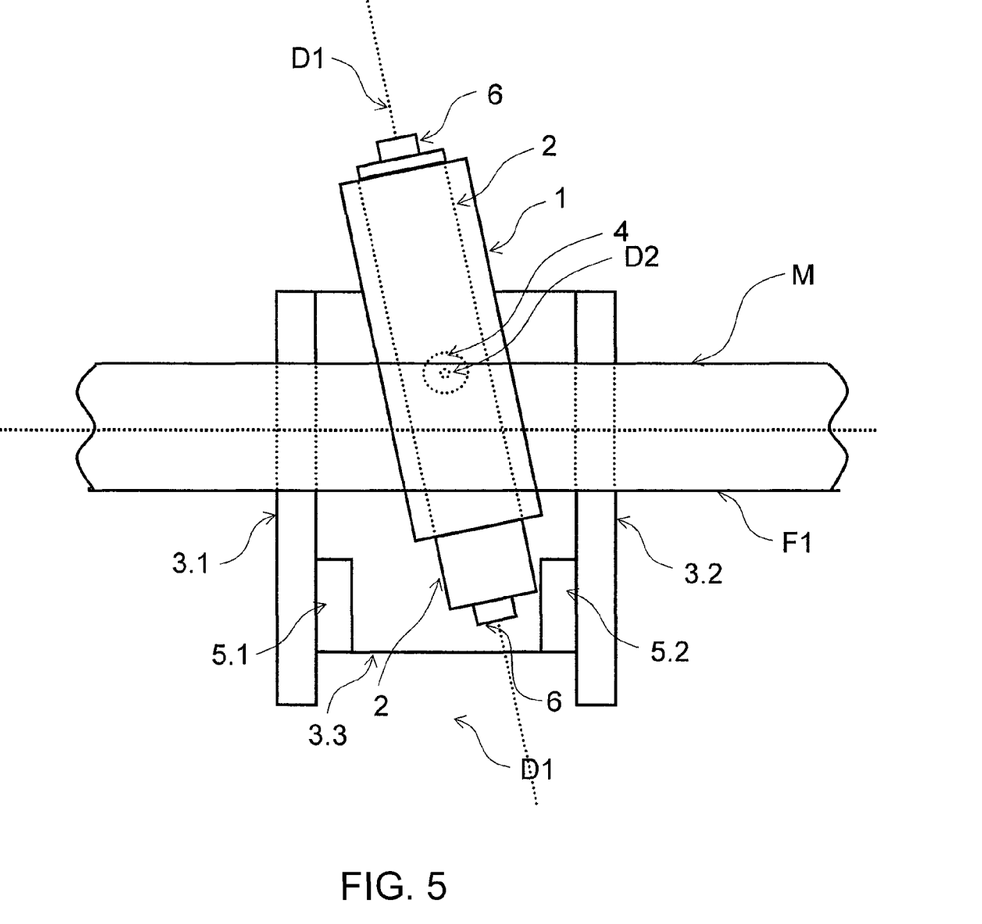
FIG. 5 is a diagrammatic, side view of the correction roller as shown in FIG. 4 but in a twisted position.

FIG. 5 shows the correction roller from FIG. 4 in the twisted position. The roller support 2 rests against the stop element 5.2.

The invention claimed is:

1. A self-correcting conveyor facility, comprising:
a conveyor belt extending along a belt axis and embodied as an elastic conveyor belt;
a correction roller having a lateral surface;
a support for said correction roller, said support having a roller support and a fixed support, said correction roller supported in a rotatable manner in said roller support, said roller support connected to said fixed support such that said roller support can be rotated relative to said fixed support about a support rotation axis, and said fixed support disposed such that an angle results between said belt axis and said support rotation axis, which is greater than 0 degrees and smaller than 90 degrees;
a displacement of said conveyor belt perpendicular to said belt axis and relative to said correction roller causes said roller support to be rotated about said support rotation axis with said correction roller and said rotation exerting a restoring force on said conveyor belt, which displaces said conveyor belt back;
said elastic conveyor belt being guided around said correction roller such that said conveyor belt rests on part of said lateral surface of said correction roller; and
said rotation of said roller support about said support rotation axis with said correction roller causes stretching of said elastic conveyor belt and the stretching produces said restoring force.

2. The conveyor facility according to claim 1,
further comprising a guide support;
further comprising at least one guide roller having a lateral surface and rotational symmetry with respect to a guide rotation axis, said guide roller is supported in said guide support such that said guide support prevents any change in a position of the guide rotation axis; and
wherein said conveyor belt is guided around said guide roller such that said conveyor belt rests on part of said lateral surface of said guide roller, positioning of said conveyor belt relative to said guide roller in a manner that deviates from a predetermined setpoint position causes a position of said conveyor belt relative to said correction roller to be changed and rotation of said roller support with said correction roller, as produced by the position change, produces said restoring force such that said restoring force displaces said conveyor belt into the predetermined set point position relative to said guide roller.

3. The conveyor facility according to claim 1, wherein said restoring force produced by the rotation displaces said conveyor belt moving in a direction of the belt axis into the predetermined setpoint position relative to said guide roller.

4. The conveyor facility according to claim 1, wherein:
said conveyor belt has a center axis; and
said correction roller is disposed such that when said conveyor belt is in a position, in which the support rotation axis intersects the belt axis, said correction roller is in a non-twisted position, in which an axis of symmetry of said correction roller is perpendicular to the belt axis.

5. The conveyor facility according to claim 1, wherein an angle between the belt axis and the support rotation axis is between 30 degrees and 80 degrees.

6. The conveyor facility according to claim 2, wherein said fixed support has at least one damping element disposed such that said damping element damps rotation of said roller support about the support rotation axis.

7. The conveyor facility according to claim 2, wherein said fixed support has a stop element for limiting rotation of said roller support about the support rotation axis.

8. The conveyor facility according to claim 7, wherein said stop element is disposed such that it limits rotation of said roller support relative to said fixed support to a rotation angle, which is a maximum of four degrees.

9. The conveyor facility according to claim 1, wherein said conveyor belt rests on part of said lateral surface of said correction roller such that an angle of wrap, with which said conveyor belt is wrapped round said correction roller, is between 2 degrees and 5 degrees respectively.

10. The conveyor facility according to claim 1, further comprising a counter-conveyor element, a clamping region being defined between said conveyor belt and said counter-conveyor element, and the conveyor facility holds a flat object temporarily in said clamping region and transporting the flat object.

11. The conveyor facility according to claim 10, wherein said correction roller is disposed such that said conveyor belt is guided around said correction roller outside said clamping region.

* * * * *